Sept. 16, 1969     W. R. CHESNUT ET AL     3,467,334
BUTT SPLICER FOR RUNNING WEB
Filed Feb. 15, 1968     6 Sheets-Sheet 6

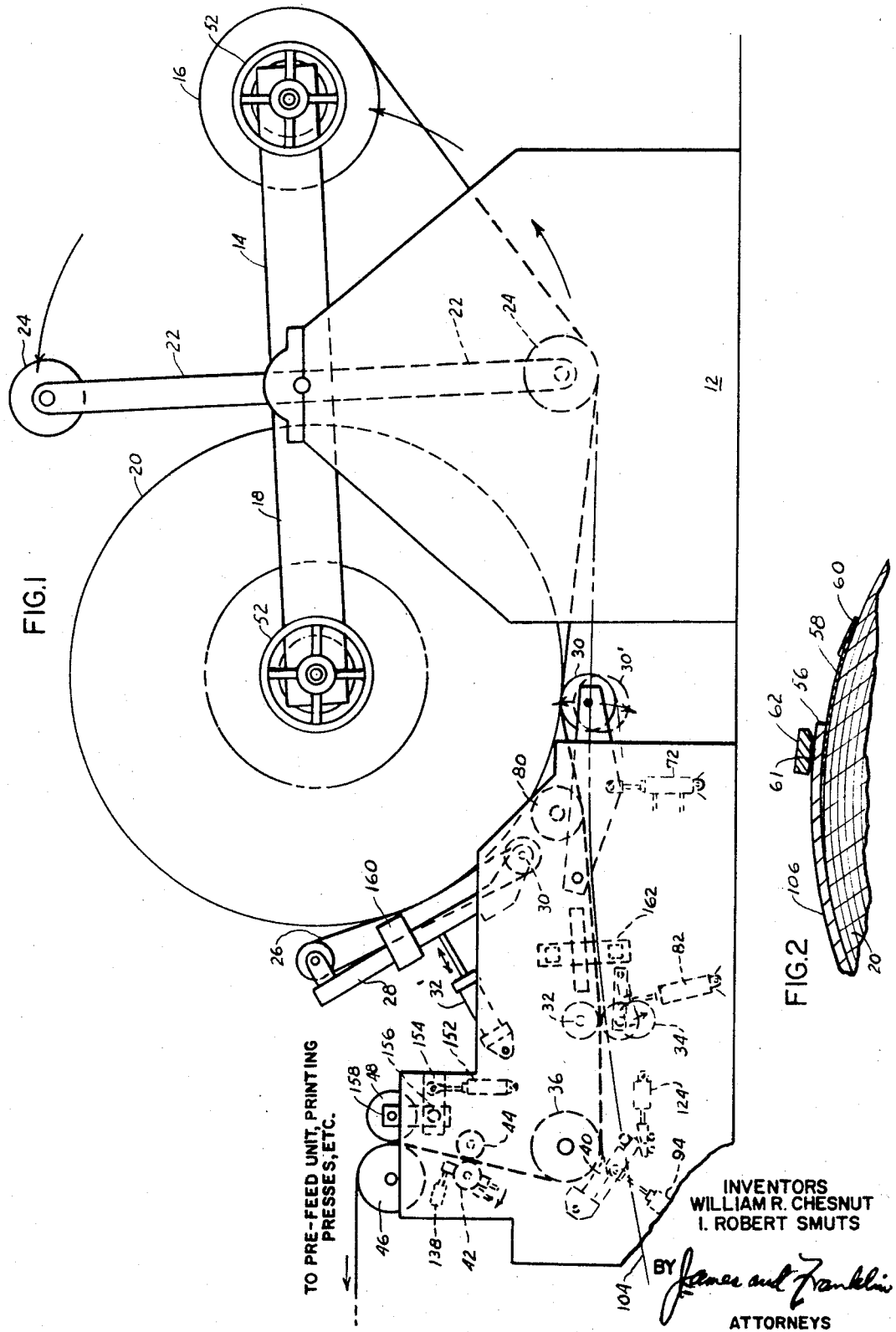

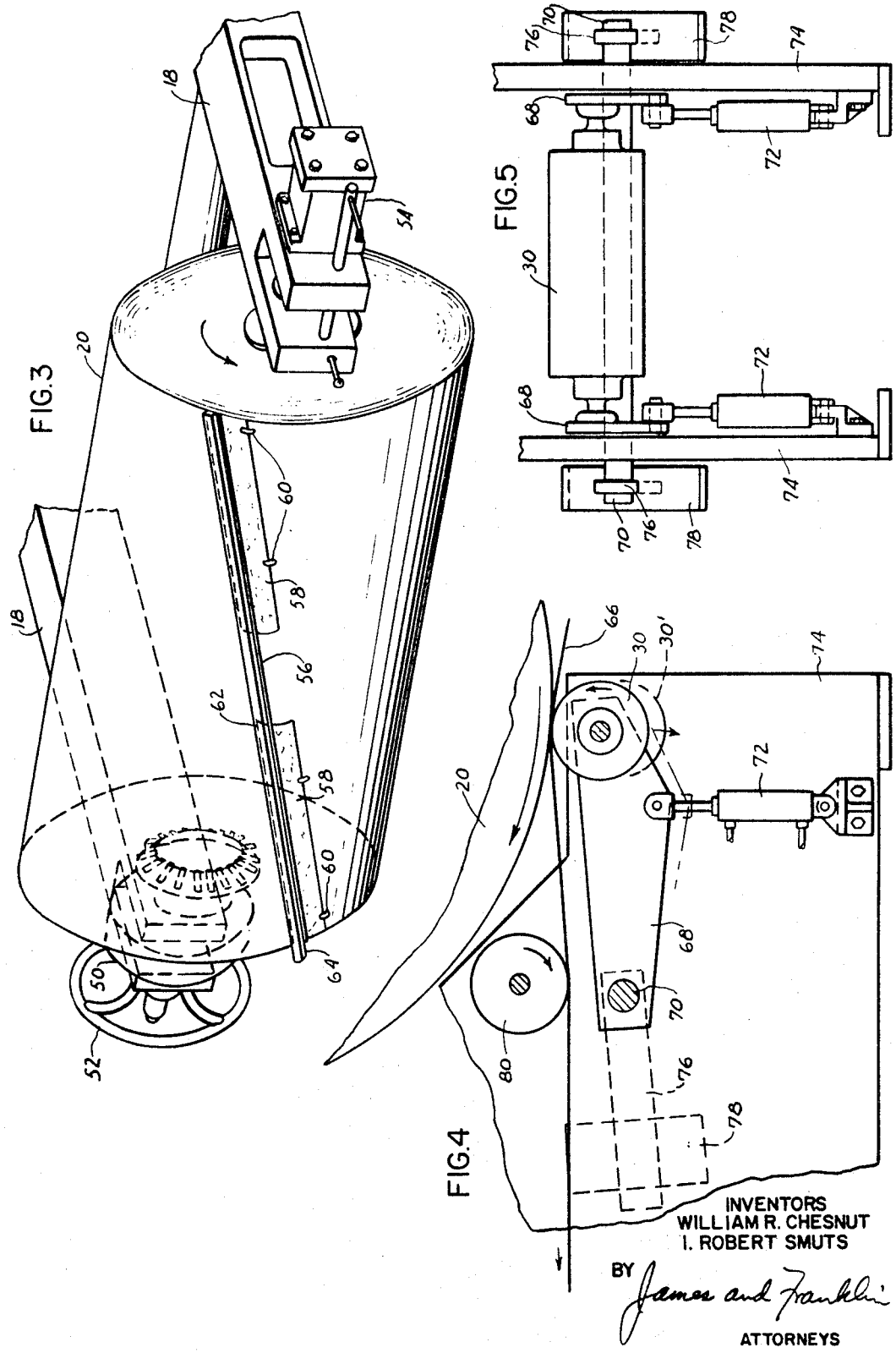

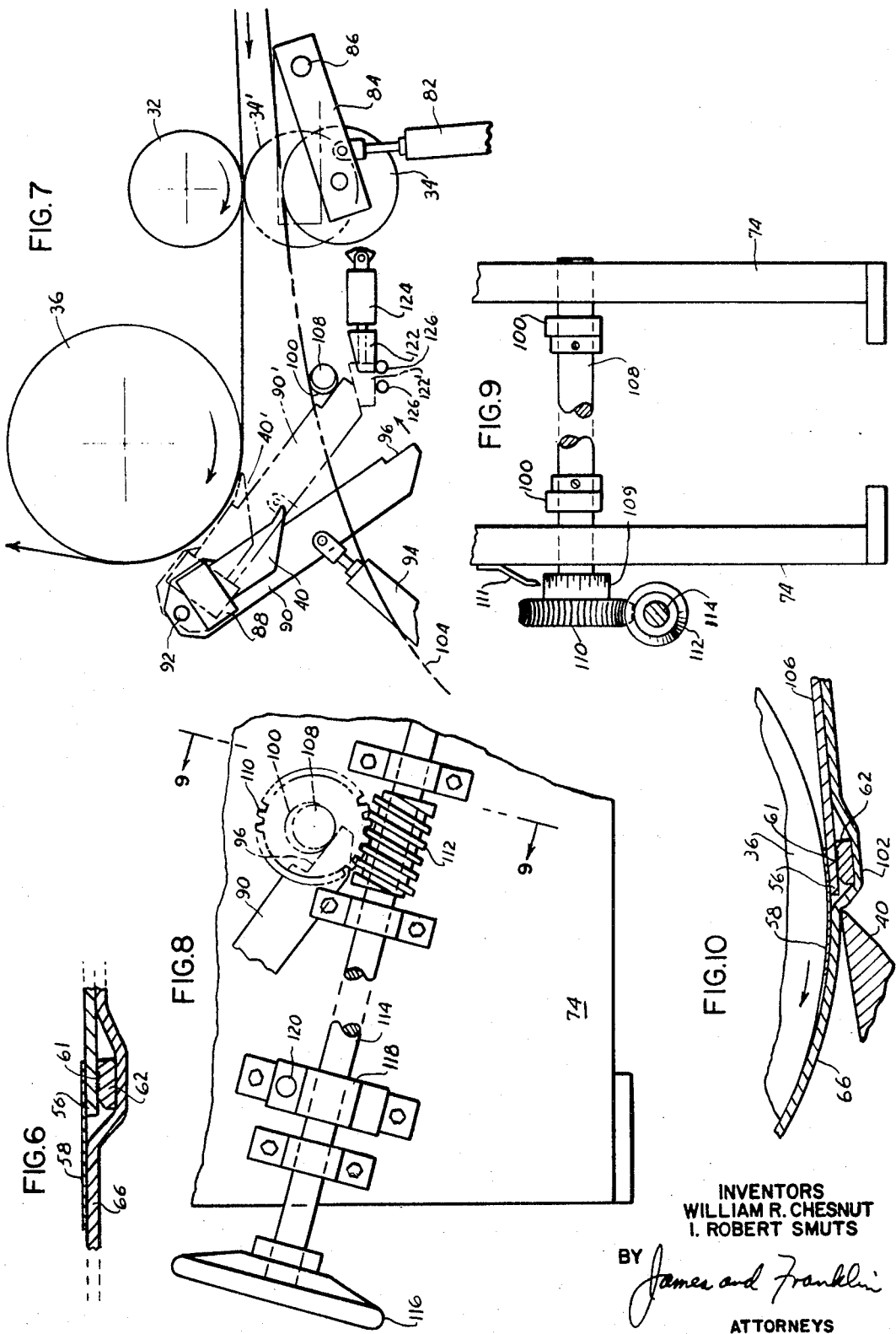

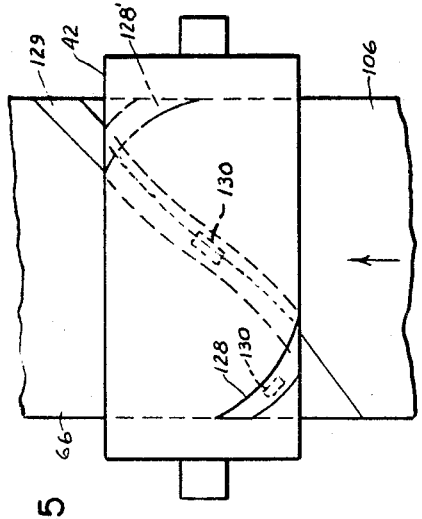
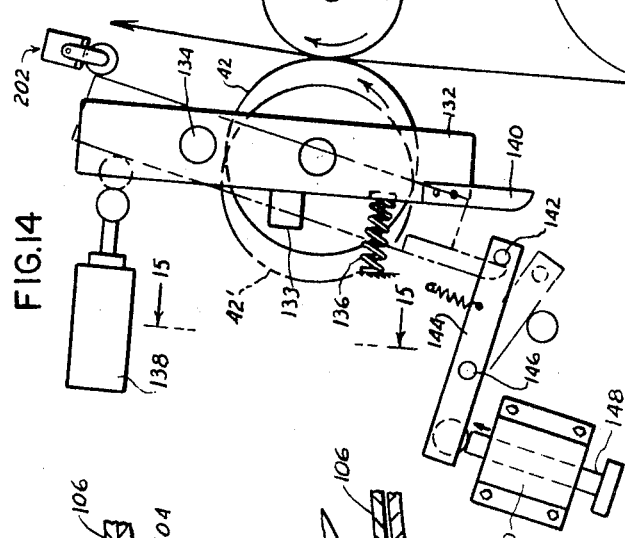
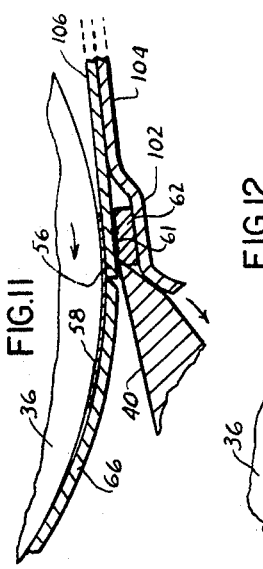
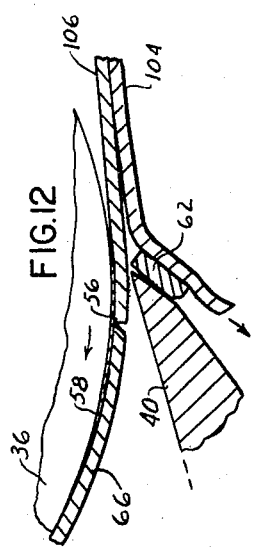
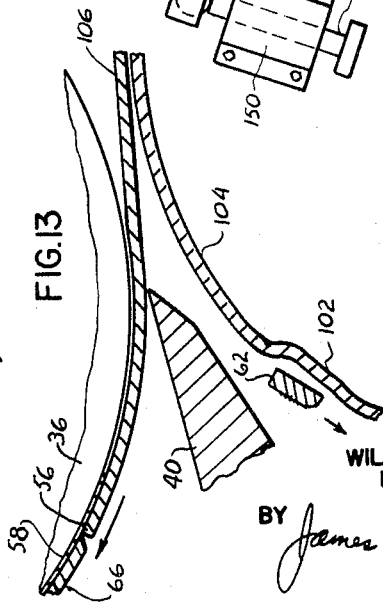
INVENTORS
WILLIAM R. CHESNUT
I. ROBERT SMUTS
BY *James and Franklin*
ATTORNEYS

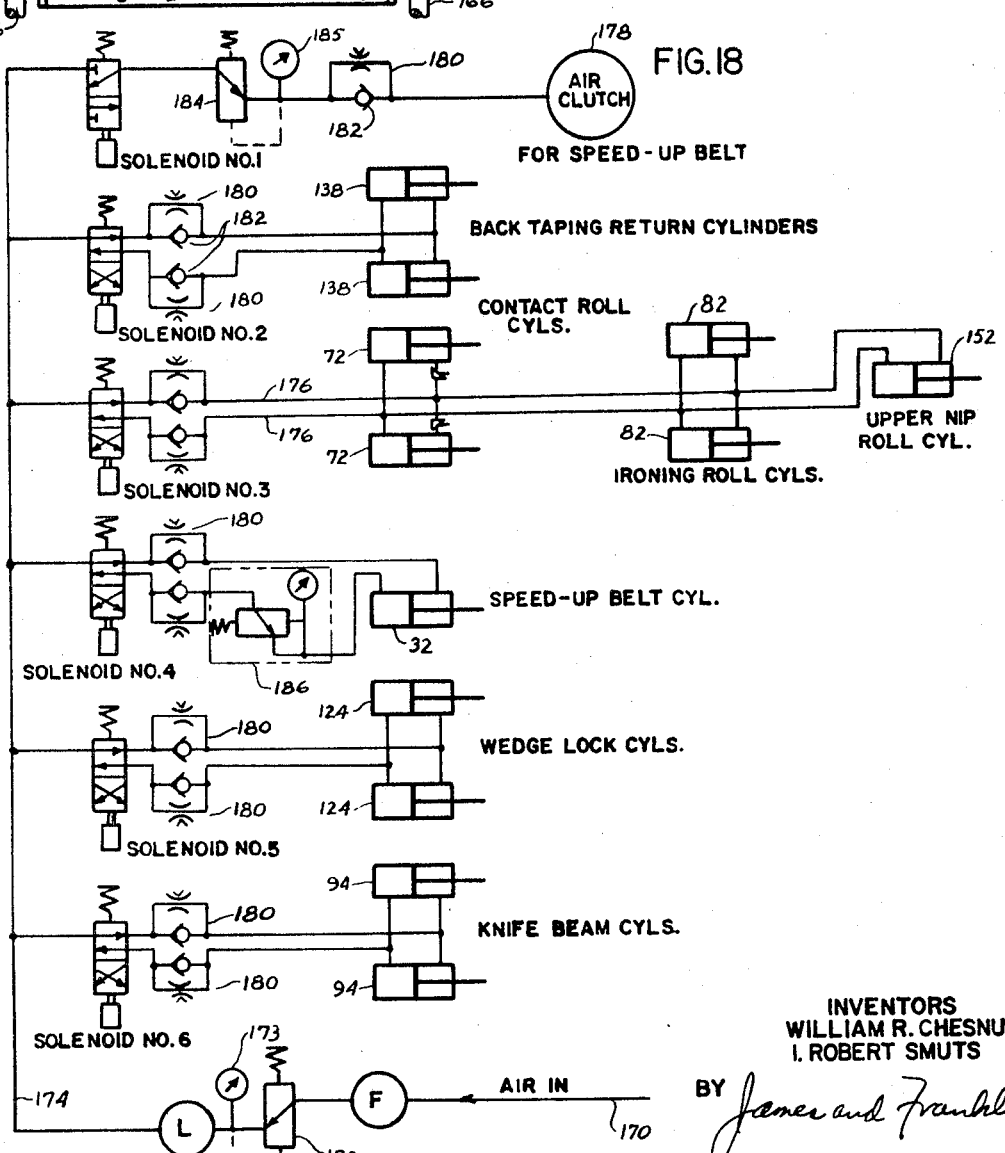

INVENTORS
WILLIAM R. CHESNUT
I. ROBERT SMUTS
BY
ATTORNEYS

United States Patent Office 3,467,334
Patented Sept. 16, 1969

---

3,467,334
BUTT SPLICER FOR RUNNING WEB
William R. Chesnut, West Caldwell, and I. Robert Smuts, North Bergen, N.J., assignors to Bobst Champlain, Inc., Roseland, N.J., a corporation of New York
Filed Feb. 15, 1968, Ser. No. 705,800
Int. Cl. B65h 19/18
U.S. Cl. 242—58.3                 19 Claims

ABSTRACT OF THE DISCLOSURE

The present apparatus employs a turnover stand for board reels, and a speed-up belt or roller to bring the new roll up to speed. The leading edge of the new roll is prepared with adhesive tape, and the apparatus includes a contact roll which presses the expiring web against the adhesive tape of the new web to secure one to the other. In preparing the new web a relatively thick build-up strip is disposed to come between the two webs when they are adhered. A knife is placed in the path of the build-up strip to sever the expiring web and guide the tail away from the new web. The prepared edge is on a bias, so that the knife has a shearing action. For additional strength at the splice a second adhesive tape is applied across the butting edges at the side of the web opposite that having the first tape. For this purpose an accurately adjustable sensor responds to the passage of a projecting end of the build-up strip for proper timing of the second tape.

Background of the invention

A running web is used in the printing and converting industry. Apparatus for splicing an expiring web to a new web has already been suggested, and to avoid the need for festooning or a deep floor pit or the like, it has been proposed to splice "on-the-fly," that is, using a tight running web running at normal press speed or line speed This is particularly difficult when working with paperboard which is thick and therefore requires a butt splice rather than an overlapping splice. Some previously used or proposed methods expose the operator to hazard and danger of injury. Our invention provides an improved and safe butt splicing system.

Summary of the invention

The present apparatus employs a turnover stand which can handle two rolls of paperboard, and a speed-up belt to bring the new roll up to speed. The leading edge of the new roll is prepared as usual with an adhesive tape, and the apparatus includes a contact roll which presses the expiring web against the adhesive tape and leading edge of the new web to secure one to the other.

However, in preparing the leading edge of the new web we apply to it a relatively thick build-up strip which later is disposed between the webs when they are adhered together by the contact roll. We place a cutter in the path of the build-up strip, and accurately spaced from an adjacent drum at the thickness of a single web, whereby the cutter severs the expiring web and guides the build-up strip and the tail of the expiring web away from the new web. The prepared edge of the new web is preferably disposed on a bias, and the cutter has a desirable shearing action because it is disposed without bias.

For additional strength a second adhesive tape or backtape is applied across the butting edges at the side of the web opposite that having the first adhesive tape. For this purpose the backtape preliminarily is applied spirally on a backtaping roll, and trigger means are provided to later move the backtaping roll against the web in proper timing to apply the backtape across the butting edges. The build-up strip may be made long enough to project from the side edge of the web, and an accurately adjustable sensor responds to the passage of the projecting end of the buildup strip for properly timing the backtaping roll.

The foregoing and additional features are described in the following detailed specification which is accompanied by drawings in which:

FIG. 1 is an elevated view of butt splicing apparatus embodying features of the invention;

FIG. 2 is a fragmentary section explanatory of how the leading edge of the new roll is prepared;

FIG. 3 is a perspective view showing the new roll on a turnover stand;

FIG. 4 is a fragmentary view drawn to larger scale, and showing the contact roller;

FIG. 5 is an elevation looking toward the right end of FIG. 4, showing the air cylinders for actuating the contact roller;

FIG. 6 is a fragmentary section showing how the leading edge of the new web is adhered to the tail of the expiring web;

FIG. 7 is a fragmentary elevation showing the cutter mechanism, and an ironing roll which precedes the cutter;

FIG. 8 is a fragmentary elevation explanatory of mechanism for accurately adjusting the position of the knife;

FIG. 9 is a fragmentary view taken approximately on the line 9—9 of FIG. 8;

FIG. 10 is a fragmentary view showing the beginning of the cutting operation for severing the tail of the expiring web;

FIGS. 11, 12 and 13 are similar views showing the cutting operation, and how the build-up strip and tail of the expiring web are guided away from the new web;

FIG. 14 is an elevation explanatory of the mechanism for operating the backtaping roll;

FIG. 15 shows how the adhesive tape is preliminarily applied to the backtaping roll;

FIG. 16 is a plan view of an adjustable sensor for triggering the backtaping roll;

FIG. 17 is a fragmentary transverse view taken approximately on the line 17—17 of FIG. 16;

FIG. 18 is an air flow diagram for the apparatus; and

Figure 19:
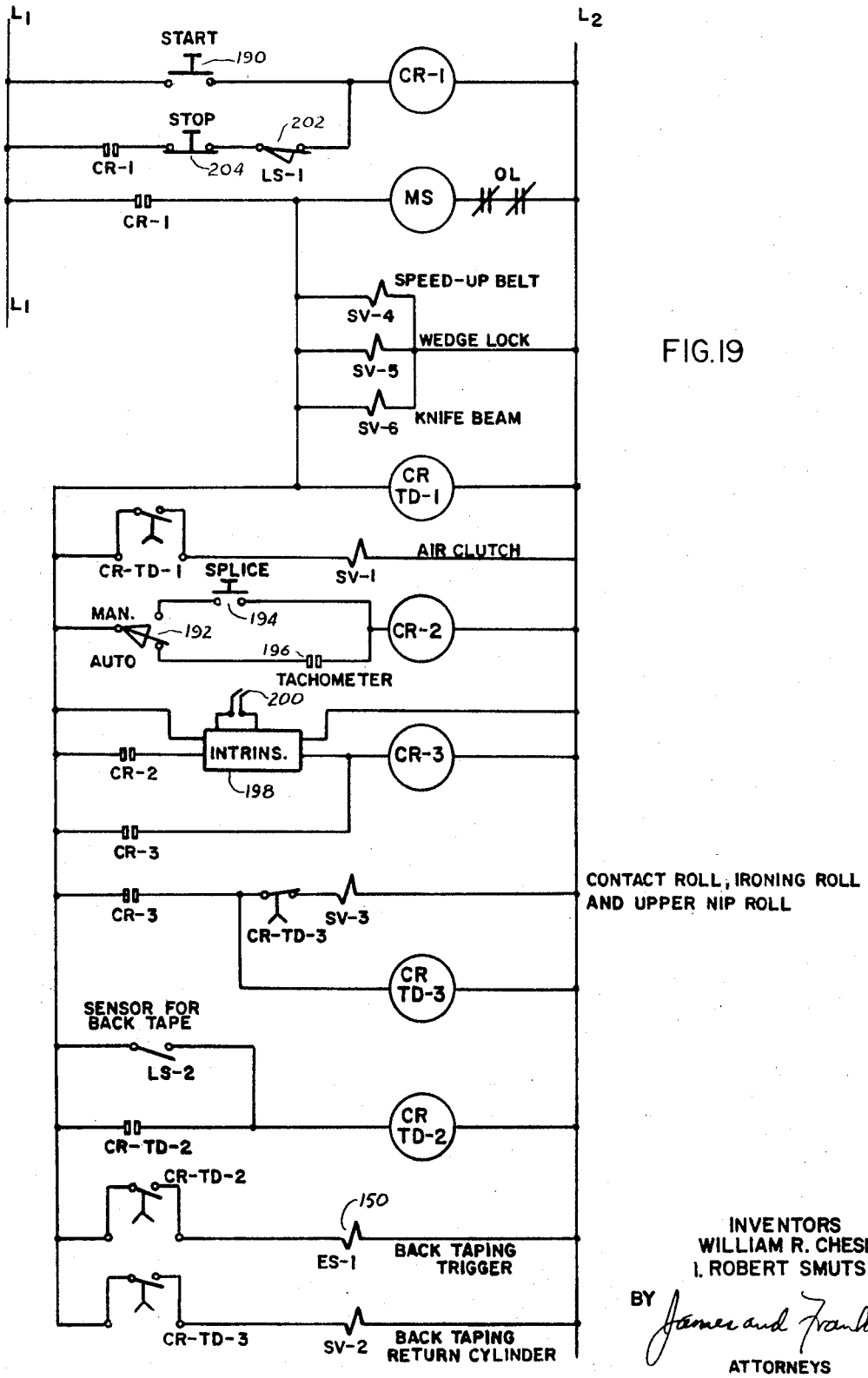
FIG. 19 is an electrical diagram for the apparatus.

Referring to the drawing, and more particularly to FIG. 1, the apparatus comprises a turnover stand generally designated 12, which may be conventional, and which has arms 14 for carrying a paper roll 16, and arms 18 for carrying a paper roll 20. There are additional arms 22 carrying deflecting rollers 24. In FIG. 1 the roll 16 is the expiring roll; the roll 20 is the new roll; and it has already been prepared and turned over from a loading position at the right, to the working position shown at the left. The new roll 20 is brought up to synchronous speed by appropriate means, in this case a speed-up belt 26 carried on an arm 28 which pivots about a lower shaft 30, and is moved inward by means of an appropriate actuator, in this case an air cylinder 32. The belt 26 is driven at shaft 30 by a motor, not shown, such speed-up arrangements being well known. The speed-up may employ a roller instead of a belt, as shown in U.S. Patent 3,195,827, issued July 20, 1965, and entitled "Splicer for Moving Web." The leading edge of the new web is prepared not only with the usual adhesive tape but also with a relatively thick build-up strip, as is described later.

The expiring web leaves paper roll 16, and passes beneath the lower deflecting roller 24, and thence idly over a contact roll 30 which normally is in the lowered or dotted line position. It then passes idly between ironing rolls 32 and 34, the latter normally being in a lowered position. The web then passes around a cut-off drum 36 which cooperates with a cutter, in this case a knife 40, which normally is in a dropped position. The web runs upward between a backtaping roll 42 and a backing roll 44, which normally are separated. The web then passes between a guide roller 46 and an upper nip roll 48, the latter usually being retracted or moved to the right. The web then runs to appropriate equipment (not shown), such as a decurler and/or a pre-feed unit, followed by printing presses or other equipment which is to be supplied with a continuous running web of paper board.

Referring now to FIG. 3, the new paperboard roll 20 is shown carried between turnover arms 18. Braking mechanism may be provided such as an airbrake indicated at 50. A hand wheel 52 affords axial or side-to-side adjustment of the paper roll. At the other end of the roll there is a suitable chucking cylinder 54. The leading edge of the new roll is preliminarily cut on the bias, as is indicated at 56, and this operation is facilited by means of a suitable guide (not shown) the upper part of which is slid beneath the leading edge, and the said guide having a front wall with a diagonal slot in which a suitable knife or razor blade may be run to cut the edge at a predetermined bias angle. The cut edge is then fitted with adhesive tape, here shown at 58. The adhesive faces outward, and part, say one third of the width of the tape is beneath the web, while the other part is exposed to later adhere to the tail portion of the expiring web. The free edge of the tape is held by a few spaced breakaway tabs indicated at 60. In addition, a relatively thick build-up strip 62 is releasably applied to the leading edge 56. The build-up strip is preferably much thicker than the paper board. One end of the build-up strip preferably projects beyond the end of the roll as shown at 64, for a reason explained later. Tape 58 may be omitted at the middle as shown, to avoid contact with the speed-up belt. It will be understood that the roll is most conveniently prepared after it has been loaded on the arms of the turnover stand, and while it is still in the right-hand position as viewed in FIG. 1. In FIG. 3 the observer is assumed to be standing at the right of the turnover stand shown at FIG. 1, and is looking toward the new roll while it is still in the rear or loading position.

Referring now to FIG. 2, the roll 20 has a leading edge 56, and adhesive tape 58 part of which is beneath the edge 56, and the other part of which is exposed, the adhesive surface facing outward. It is held on the roll by a few small breakaway tabs 60. The relatively thick build-up strip is shown at 62 and may be held by means of a few pieces of narrow double faced adhesive tape 61 at the bottom of the strip. They are small for easy breakaway. The build up strip is parallel to and close to the prepared bias-cut edge 56 of the new roll. It may be made of fibrous material such as leather, felt, rubber, plastic, or other somewhat pliable material. A gasket material sold commercially as "Vellumoid" is satisfactory. The strip is reusable.

Referring now to FIGS. 4 and 5, the expiring web 66 passes idly beneath the new paper roll 20 and over the contact roll 30, which normally is in the lowered position shown in broken lines at 30′. The contact roll 30 is carried between spaced arms 68, pivoted at 70, and actuated by two spaced air cylinders 72 carried by the sides 74 of the frame. Some or all of the weight of contact roll 30 may be counterbalanced by means of arms 76 carrying weights 78 which are adjustably slidable along the arms 76 to obtain a desired counterbalance. It will be understood that the contact roll 30 is raised only when a splice is to be made, and that it serves to press the expiring web 66 upward against the new roll 20, until the adhesively prepared leading edge of the new roll reaches the expiring web, at which time they are adhered together and the new web runs along with the expiring web. The new paper roll 20 has been preliminarily brought up to speed by means of the speed-up belt shown at 26 in FIG. 1. The roll 80 shown in FIGS. 1 and 4 is simply a guide roll.

Referring now to FIG. 6, it will be seen how the leading edge 56 of the new web is adhesively secured by means of the tape 58 to the expiring web 66, with the build-up strip 62 between the new and old webs, at the leading edge of the new web.

Referring now to FIG. 7, the double web preferably passes between the ironing rolls 32 and 34 previously mentioned, the roll 34 being raised to the broken line position 34′ during the splicing operation. It is raised by a pair of spaced actuators, in this case two air cylinders 82 which raise arms 84 pivoted at 86. The upper roll 32 is preferably a steel roll, and the lower roll 34 is preferably a rubber roll, and it serves the purpose of pressing or bending the expiring web 66 (FIG. 6) somewhat more closely around the build-up strip 62.

Reverting to FIG. 7, a cutter or knife blade 40 is carried by a rigid bar or beam 88 fixed between spaced arms 90 which are pivoted at 92, and which may be moved upward from the solid line position 90 to the broken line position 90′ by means of a pair of actuators or air cylinders 94. The ends of arms 94 have hardened stop surfaces at 96. These move upward to and are arrested by a pair of spaced stops indicated at 100.

Referring now to FIG. 10, when cutter 40 is raised it is moved to a position corresponding to a single web thickness plus a small clearance, that is, the spacing between the surface of the cut-off drum 36 and the edge of the knife 40 approximately equals a single thickness of the paperboard, and therefore the raised part 102 of the expiring web 66 is cut by the knife at the leading edge of the new web. The cut is parallel to the prepared edge 56 of the new web, and is located at or slightly short of the edge 56, so that the two edges are end to end as they should be, rather than overlapped. FIGS. 11, 12 and 13 show how the knife 40 serves further to guide the build-up strip 62 and the tail 104 of the expiring web away from the new web 106. The bias arrangement shown in FIG. 3 has the important advantage that the knife 40 may be a simple straight knife, perpendicular to the long axis of the web, and yet it cuts with a shearing action.

Accurate positioning of the knife 40 is highly important, and we provide mechanism permitting the desired accurate adjustment. FIGS. 7, 8 and 9 show stops 100 which are eccentrically mounted on a sturdy rotatable shaft 108 which extends through the sides 74 of the splicer frame. Shaft 108 may be turned very gradually by means of a worm gear 110 meshing with a worm 112 carried on a shaft 114 which is rotated by a hand wheel 116. The adjustment is aided by a scale 109 (FIG. 9) on shaft 108 cooperating with a fixed pointer 111 on frame 74, and may be locked by means of a clamp 118 (FIG. 8) tightened by means of a screw 120. Thus the position of the stops 100 may be accurately adjusted.

Referring to FIG. 7, the desired accurate positioning of the knife 40 is further insured by means of wedge locks 122, which are moved by air cylinders 124, from the solid line position to the dotted line position 122′, at which time they bear against mating surfaces at the ends of the arms 90, while riding over appropriate rollers 126, thus wedging the arms 90 upward and tightly against the stops 100. In this way the cutting position of the knife beam 88, and consequently the knife 40, is established with great precision.

As so far described the splice is maintained by means of an adhesive tape 58 on only one side of the web, as shown in FIGS. 11–13. The splice is preferably reinforced by the application of adhesive tape on the opposite face of the web. This is done with the aid of a back taping roll 42 shown in FIGS. 14 and 15. An appropriate length of pressure sensitive adhesive tape is applied to roll 42 in spiral formation, as shown at 128. The roll 42 is appropriately marked as shown at 128′ to guide the spiral application of tape 128, and the latter is held on the roll by means of a few pieces of double faced adhesive tape 130, the adhesive of the main tape 128 being outward. The angle of the spiral is made such as to conform to the bias cut of the splice. The part 129 has already adhered to the spliced webs which are traveling upward.

Referring to FIG. 14, the back taping roll 42 is normally in the retracted position shown in broken lines at 42′. It is carried by arms 132 which are pivoted at 134, and which are normally urged to the right by compression springs 136. They may be retracted against the force of the springs 136 by means of air cylinders 138 which bear against the upper ends of the arms 132 and move them toward the right, thus moving the lower ends of the arms toward the left where they are latched in retracted position by means of catches 140 which are received and held behind stop pins 142. These pins are on arms 144 pivoted at 146 and operated to release the catches when solenoid core 148 is drawn upwardly into solenoid coil 150. This releases the back taping roll 42 which moves abruptly to the right and applies the back tape, the pressure being taken at the rear by the back roll 44.

The rotative position of the roll 42 at rest is determined by a yieldable stop here schematically indicated by block 133 on arm 132 in FIG. 14. It employs leaf springs which readily yield when the roll is triggered against the web by solenoid 150.

Reverting to FIG. 1 the second tape may be additionally pressed or ironed against the butting edges by means of an upper nip roll 48, which normally is retracted but which is moved to the left during the splicing operation by means of an air cylinder 152. This turns an arm 154 secured to a shaft 156 carrying two spaced arms 158 which carry the nip roller 48.

The splicing operation may be initiated automatically but in the present case is initiated manually when the operator sees that the expiring roll (16 in FIG. 1) has been nearly exhausted. A sensor generally designated 160 in FIG. 1 determines the start of the splicing operation in relation to the rotational position of the paper roll 20. If desired, the sensor may be of the type shown in the aforesaid Pat. 3,195,827 which employs a proximity head which responds to a piece of magnetic (iron oxide) tape adhered to the roll 20. Alternatively, a pair of conductive wires may be provided alongside of and following the same path as the speed-up belt 26, and these may contact a piece of metal foil adhered to the roll 20. Such sensing arrangements for splicing apparatus are well known, and require no detailed description.

No great precision is needed for the operation of the contact roll 30 because that takes effect only when the adhesive tape on roll 20 reaches the expiring web. Thus the contact roll 30 may be raised for most of one revolution of the paper roll 20. The back tape however must be positioned on the butting edges, and the tripping must be precise. For this purpose we provide a second sensing mechanism which is located ahead of the knife 40, and in the present case is indicated at 162 in FIG. 1. It was stated in connection with FIG. 3 that the build-up strip projects beyond one end of the roll 20 as shown at 64 in FIG. 3. This is for cooperation with the sensor located at 162 in FIG. 1.

The parts are shown in greater detail in FIGS. 16 and 17, in which the old web 66 is shown spliced to the new web 106 by means of the first adhesive tape 58. The build-up strip is shown at 62, with a projecting end at 64. FIG. 17 shows how the projecting end 64 passes between the top and bottom elements of the sensor 162, which may be of the photo-electric, or any other desired type. The sensor 162 is slidably mounted on an L-shaped bar 164 (FIGS. 16 and 17) carried on cross rods 166. The bar 164 has a scale cooperating with a pointer 168. The bar 164 is slidable along the rods 166 to take care of a change of width of the web being handled. The sensor 162 is slidable along the bar 164 for adjustment of the precise time of application of the back tape. The adjustments are locked by means of thumb screws, as shown.

FIG. 18 is an air flow diagram for the apparatus. Compressed air is supplied at 170 and passes through a filter F, and thence through a pressure regulator 172 with an air gauge 173, and thence through a lubricator L to a pipe or manifold 174. This supplies air for the back taping return cylinders 138; the contact roll cylinders 72; the cylinder 32 for moving the speed-up belt; the cylinders 124 for the wedge locks of the knife; and the cylinders 94 for moving the knife to cutting position. The contact roll cylinders 72 are supplied through pipes 176, and it will be seen that these same pipes extend to and actuate the ironing roll cylinders 82 and the upper nip roll cylinders 152, which cylinders may be actuated for the entire duration of the splicing operation. The speed-up belt is motor driven through an air clutch indicated at 178.

All of these air operated elements are controlled by solenoid air valves marked "Solenoid #1," "Solenoid #2," etc. reading from the top toward the bottom of the diagram. In each case the rate of air flow may be adjusted by proper flow control valves 180 (usually combined with checks 182), shown following the solenoid air valves on the diagram.

Part 184 is a pressure regulator with a gauge 185. Rectangle 186 represents a pressure regulator and gauge which are located at the operator's side of the machine for easy adjustment.

An electrical diagram is shown in FIG. 19, referring to which the electrical power is supplied on lines L1 and L2. The parts SV1, SV2, etc. represent the coils of the solenoid air valves Nos. 1 through 6 shown in the air flow diagram of FIG. 18.

Assuming the new roll has been prepared, and has been moved into the working position shown in FIG. 1, and that the back taping roll also has been prepared, the operator observes the expiring roll, and when it has become small enough he presses a start button 190. This energizes the coil of a control relay CR–1 (FIG. 19) which closes the contacts CR1, the upper contacts being holding contacts, and the lower contacts serving to energizes the motor starter MS, with its overload protection OL. This starts the motor of the speed-up belt. The solenoids SV–4, SV–5 and SV–6 are also energized, thus bodily moving the speed-up belt into working position; moving the knife beam into cutting position; and moving the wedge locks into locking position. The latter movement is somewhat delayed by appropriate adjustment of its air flow control valves.

Time delay relay CR–TD–1 is also energized, thereby closing the contacts CR–TD–1 which in turn energize the solenoid SV–1 of the air clutch for the speed-up drive, thus driving the speed-up belt. The delay is to insure firm contact against the roll before driving the roll. Synchronous speed of the new roll may be gauged either manually or automatically, by use of the switch 192. In the upper switch position (manual operation), the operator observes a tachometer, and at proper speed presses the pushbutton 194, thereby energizing the coil of control relay CR–2. If the switch 192 is put in the lower or automatic position, then the contacts 196 of a tachometer-controller close automatically when the desired or preset speed is attained, and here again the relay coil CR–2 is energized. The tachometer-controller needs no detailed description and may, for example, be a Reliance tachometer-controller manufactured by Barbour Stockwell Instruments Division of Curtis and Marble Machine Co. of Worcester, Mass.

Energization of relay coil CR–2 closes its contacts CR–2. This energizes the "intrinsically safe" relay 198 which supplies a greatly reduced voltage to contact wires 200, which are the previously mentioned wires of the sensing device schematically symbolized at 160 in FIG. 1, for response to a piece of metal foil adhered to the new paper roll. When the circuit at 200 is closed, the coil of relay CR–3 is energized, thereby closing its upper and lower contacts CR–3, the upper contacts being holding contacts, and the lower contacts then being held closed. This energizes the solenoid coil SV–3 of the air valve which supplies power to the actuators of the contact roll, the ironing roll, and the upper nip roll (shown in FIG. 18 with common supply pipes 176).

At the same time the closing of the contacts CR–3 energizes the coil of the time delay relay CR–TD–3. This delay relay has a long enough delay for the entire splicing cycle.

When the second sensor (162 in FIGS. 1, 16 and 17) is actuated by passage of the build-up strip extension, it closes the contracts marked LS–2 (FIG. 19), and this energizes the coil of another time delay relay CR–TD–2. This has a precision adjustable time delay, and is accurately adjusted to proper trigger the release of the back taping roll (42 in FIGS. 1 and 14). The relay immediately closes and is held closed by its upper contacts CR–TD–2, and after the preset time delay is expired, the lower contracts CR–TD–2 are closed, thereby energizing the solenoid coil ES–1 (which coresponds to the solenoid 150 shown in FIG. 14) and thus releases the back taping roll 42. The time delay of relay CR–TD–3 is longer than that of CR–TD–2, and when its time expires, the upper contracts CR–TD–3 open, and the lower or normaly open contracts CR–TD–3 at the bottom of the diagram close. This energizes the solenoid coil SV–2 of the solenoid air valve for the return cylinders (138 in FIGS. 14 and 18) of the back taping roller, thus restoring it to retracted position where it is latched and held until the next splicing operation.

When the upper contracts of the relay CR–TD–3 open, solenoid coil SV–3 is deenergized, thus opening all nip pressures of the contact roll 30 (FIG. 1), ironing roll 34, and upper nip roll 48. This stops feeding of the separated tail 104 (FIGS. 1 and 13), thus controlling the length of the loose or unwound tail. The operator may pull the remaining tail through the press, or may cut off the unwound tail for removal, and then remove any remainder with the mandrel from the rear arms of the turnover stand, or what is more commonly done, he may roll the loose tail back onto the mandrel, and then remove the mandrel with the entire residuary web or tail from the travel stand.

During the latching of the back tape roll 42 (FIG. 1) a limit switch (202 in FIG. 14) is opened, and now reverting to FIG. 19, the opening of this limit switch 202, also marked LS–1 near the top of the diagram, deenergizes the relay CR–1, whereupon its upper and lower contacts CR–1 open, thus deenergizing the entire system, and everything returns to its normal or rest condition as it was before the splicing operation. The same result may be obtained by pressing the "Stop" button 204.

The splicing operation is very fast, taking only a fraction of a second for web running at high velocities. The preparation takes time, but ample time is available while the previous paper roll is being used up. The operator removes the tail end of the expired web as previously explained before making ready for the next splice cycle by loading a new roll into the turnover stand, preparing the roll, and moving it from rear to forward position.

The preliminary procedure may be reviewed as follows. A new roll is loaded at the back of the turnover stand, while the previous web is running through the printing press or other equipment. The leading edge is cut on a bias using a specially designed guide or cutting fixture. Two pieces of adhesive tape 58 are attached under the leading edge with tacky side out, and the build-up strip 62 is attached to the outside of the leading edge. The free edge of the tape 58 is secured to the roll with a few breakaway tabs 60 (see FIGS. 2 and 3). Metal foil is applied to the first sensor (or magnetic tape etc. as previously explained).

The operator pre-cuts another length of splicing tape and places it on the back-taping roller 42, on marks or lines painted on the surface of said roller. The back tape is held with the tacky side out, as by means of short narrow pieces of double sensitive tape.

The operator sets the pointer of a tachometer-controller at a figure in feet-per-minute matching the speed of the web running in the press.

If board of a different caliper is threaded through the press, it is necessary for the operator to first set the cut-off knife to proper clearance. He accomplishes this with a stationary web by using a shim between the cutting edge of the blade and the new board which is bent around the cut-off drum. The operator then turns the handwheel (116 in FIG. 8) to move the stop cams until there is resistance. The hand wheel is locked to maintain the adjustment. The operator then retracts the knife by means of the air cylinders 94, and removes the shim. During the subsequent automatic splicing cycles, the blade edge will come up to the new web with the same small clearance previously set by use of the shim.

There ordinarily is no need to change the thickness of the build-up strip. As an example, working with webs up to a thickness of 0.035 inch we have successfully used a build-up strip having a thickness of ⅛ inch. The thickness of the build-up strip is not at all critical, and might equally well vary from say 3/32 to 5/32 inch. Its only purpose is to outwardly displace or bend the expiring web into the path of the fixed knife at a point just ahead of the leading edge of the new web.

The operator shifts the turnover arms when the expiring roll reaches a specified diameter, which may be marked by the operator at the time the roll is being loaded as a new roll into the turnover stand. The turnover arms move, carrying the new roll up and forward, and bringing the expiring roll down and rearward toward the loading end of the machine. A limit switch may be used on the stand to stop the new roll in the desired splicing position. When the old roll is nearly expired the operator presses the "Start" button, with results described in detail above in connection with FIG. 19.

It is believed that the construction and method of use of our improved butt splicer, as well as the advantages thereof, will be apparent from the foregoing detailed description. It will also be understood that while we have shown and described the splicer in a preferred form, changes may be made without departing from the scope of the invention, as sought to be defined in the following claims. In the claims the reference to air cylinders controlled by solenoid operated air valves is not intended to exclude the use of generally equivalent mechanism using a fluid other than air.

We claim:

1. The method of making a butt splice between an expiring running web of paperboard, and a new web, which includes preparing the leading edge of the new web with adhesive tape and with a thick build-up strip, pressing the expiring web against the adhesive tape and leading edge of the new web with the build-up strip between the two webs, and disposing a cutter in the path of the build-up strip at approximately the thickness of one web, whereby the cutter severs the expiring web at the leading edge of the new web and guides the build-up strip and the tail of the expiring web away from the new web.

2. The method of claim 1, which includes preparing the aforesaid leading edge and adhesive tape and build-up strip on a bias angle, and disposing the cutter at an angle to the bias angle, whereby the cutter has a shearing action.

3. The method of claim 2, with the additional step of thereafter applying a second adhesive tape across the butting edges of the webs at the side of the webs opposite that having the first adhesive tape.

4. The method of claim 3, which includes making the build-up strip long enough to project from the side edge of the web, and using the projecting end to trigger the application of the second adhesive tape in proper location across the butting edges.

5. The method of claim 1, with the additional step of thereafter applying a second adhesive tape across the butting edges of the webs at the side of the webs opposite that having the first adhesive tape.

6. The method of claim 5, which includes making the build-up strip long enough to project from the side edge of the web, and using the projecting end to trigger the application of the second adhesive tape in proper location across the butting edges.

7. Apparatus for making a butt splice between an expiring running web of paperboard and a new web, said apparatus comprising a thick build-up strip releasably adhered to an adhesively prepared leading edge of the new web, means for pressing the expiring web against the adhesively prepared leading edge of the new web with the build-up strip between the two webs, and a cutter disposed in the path of the build-up strip at approximately the thickness of one web, whereby the cutter severs the expiring web at the leading edge of the new web and guides the build-up strip and the tail of the expiring web away from the new web.

8. Apparatus as defined in claim 7, in which the leading edge of the new web and the build-up strip are disposed on a bias angle, and the cutter is disposed at an angle to the bias angle, whereby the cutter has a shearing action.

9. Apparatus as defined in claim 8, in which there is a back taping roll prepared with a second adhesive tape, and means to operate the back taping roll to apply a second adhesive tape across the butting edges at the side of the webs opposite that having the first adhesive tape.

10. Apparatus as defined in claim 7, in which there is a back taping roll prepared with a second adhesive tape, and means to operate the back taping roll to apply a second adhesive tape across the butting edges at the side of the webs opposite that having the first adhesive tape.

11. Apparatus as defined in claim 10, in which the build-up strip is long enough to project from the side edge of the web, and in which there is a sensor responsive to passage of the projecting end of the build-up strip to trigger the operation of the back taping roll to apply the second adhesive tape in proper location across the butting edges.

12. Apparatus as defined in claim 7, further comprising a turnover stand supporting the new and the expiring rolls of paperboard, speed-up mechanism for bringing the new roll up to the speed of the expiring web, an air cylinder to move the speed-up mechanism to the new roll, a contact roll spaced below the expiring web, an air cylinder to move the contact roll upward to press the expiring web against the new roll, spaced ironing rolls above and below the resulting double web, an air cylinder for moving said rolls together with the webs therebetween, solenoid operated air valves for controlling the operation of the air cylinders, and electrical circuitry for energizing the air valves in proper timed sequence.

13. Apparatus as defined in claim 7, in which the cutter is a knife spaced from the running web and carried by arms for movement to a position adjacent the web, adjustable stops to determine the position of the knife at the web, an air cylinder to move the arms and knife to the stops, wedges to urge the arms tightly against the stops, an air cylinder to move the wedges from retracted to wedging position, solenoid operated air valves for controlling the operation of the air cylinders, and electrical circuitry for energizing the air valves in properly timed sequence.

14. Apparatus as defined in claim 7, further comprising a turnover stand supporting the new and the expiring rolls of paperboard, speed-up mechanism for bringing the new roll up to the speed of the expiring web, a contact roll spaced below the expiring web, an air cylinder to move the contact roll upward to press the expiring web against the new roll, the cutter being a knife spaced from the running web and carried by arms for movement to a position adjacent the web, adjustable stops to determine the position of the knife at the web, an air cylinder to move the arms and knife to the stops, solenoid operated air valves for controlling the operation of the air cylinders, and electrical circuitry for energizing the air valves in properly timed sequence.

15. Apparatus as defined in claim 7, further comprising a turnover stand supporting the new and the expiring rolls of paperboard, speed-up mechanism for bringing the new roll up to the speed of the expiring web, a contact roll spaced below the expiring web, an air cylinder to move the contact roll upward to press the expiring web against the new roll, the cutter being a knife spaced from the running web and carried by arms for movement to a position adjacent the web, adjustable stops to determine the position of the knife at the web, an air cylinder to move the arms and knife to the stops, wedges to force the arms tightly against the stops, an air cylinder to move the wedges from retracted to wedging position, solenoid operated air valves for controlling the operation of the air cylinders, and electrical circuitry for energizing the air valves in properly timed sequence.

16. Apparatus as defined in claim 7, further comprising a turnover stand supporting the new and the expiring rolls of paperboard, speed-up mechanism for bringing the new roll up to the speed of the expiring web, a contact roll spaced below the expiring web, an air cylinder to move the contact roll upward to press the expiring web against the new roll, spaced ironing rolls above and below the resulting double web, an air cylinder for moving said rolls together with the webs therebetween, said cutter being a knife spaced from the running web and carried by arms for movement to a position adjacent the web, adjustable stops to determine the position of the knife at the web, an air cylinder to move the arms and knife to the stops, wedges to urge the arms tightly against the stops, an air cylinder to move the wedges from retracted to wedging position, solenoid operated air valves for controlling the operation of the air cylinders, and electrical circuitry for energizing the air valves in properly timed sequence.

17. Apparatus as defined in claim 10, in which the backtaping roll is normally spaced from one side of the web, a roll on the opposite side of the web, resilient means urging the backtaping roll toward the web, a latch to hold the backtaping roll in retracted position against the force of the resilient means, a solenoid to release the latch, an adjustable sensor for timing the application of the second adhesive tape, and electrical circuitry for energizing the latch solenoid.

18. Apparatus as defined in claim 10, further comprising a guide roll and a nip roll spaced from the guide roll, an air cylinder for moving the nip roll against the web for additionally pressing the backtape across the butting edges at the side of the web opposite that having the first adhesive tape, a solenoid controlled air valve for the cylinder, and electrical circuitry for energizing the air valve in proper timing.

19. Apparatus as defined in claim 10, in which the backtaping roll is normally spaced from one side of the web, a roll on the opposite side fo the web, resilient means urging the backtaping roll toward the web, a latch to hold the backtaping roll in retracted position against the force of the resilient means, a solenoid to release the latch, a guide roll, a nip roll spaced from the guide roll, an air cylinder for moving the nip roll against the web for additionally pressing the backtape across the butting edges at the side of the web opposite that having the first adhesive tape, a solenoid controlled air valve for the cylinder, an adjustable sensor for timing the application of the second adhesive tape, and electrical circuitry for energizing the latch solenoid and the air valve in proper timing.

References Cited

UNITED STATES PATENTS

| | | | |
|---|---|---|---|
| 2,703,682 | 3/1955 | Jacobs | 242—58.2 |
| 3,195,827 | 7/1965 | Schowerer et al. | 242—58.2 |
| 3,276,710 | 10/1966 | Zernov et al. | 242—59 |
| 3,391,877 | 7/1968 | Angell et al. | 242—58.3 |

LEONARD D. CHRISTIAN, Primary Examiner

U.S. Cl. X.R.

156—504; 242—59